April 7, 1942.     E. TEDESCHI     2,278,905
ROAD INDICATOR
Filed July 31, 1939     5 Sheets-Sheet 1

Enrico Tedeschi
INVENTOR
BY Victor J. Evans & Co.
ATTORNEYS

April 7, 1942.　　　E. TEDESCHI　　　2,278,905
ROAD INDICATOR
Filed July 31, 1939　　　5 Sheets-Sheet 2

Enrico Tedeschi
INVENTOR

BY Victor J. Evans & Co.
ATTORNEYS

April 7, 1942.  E. TEDESCHI  2,278,905
ROAD INDICATOR
Filed July 31, 1939  5 Sheets-Sheet 3

Enrico Tedeschi
INVENTOR

BY Victor J. Evans & Co.
ATTORNEYS

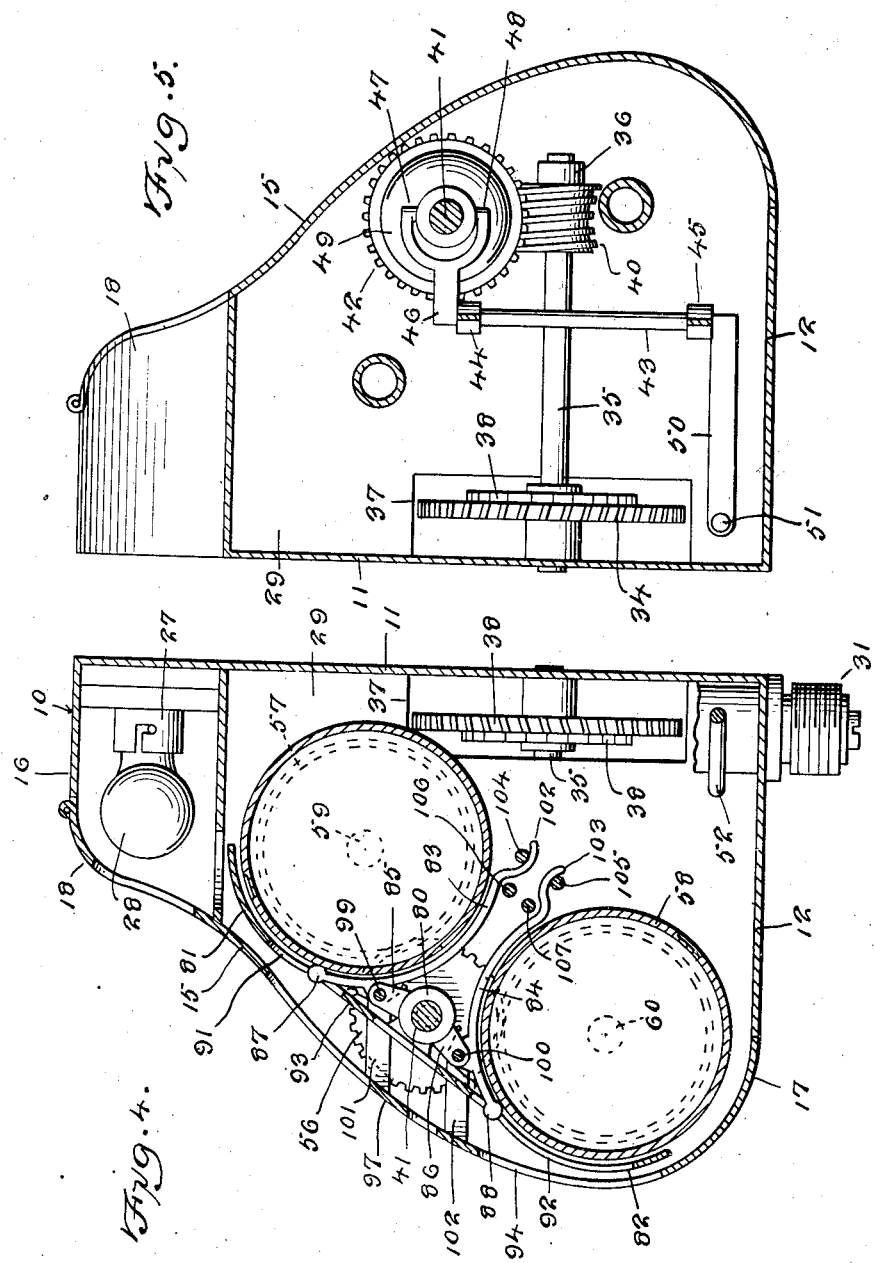

April 7, 1942.   E. TEDESCHI   2,278,905
ROAD INDICATOR
Filed July 31, 1939   5 Sheets-Sheet 5
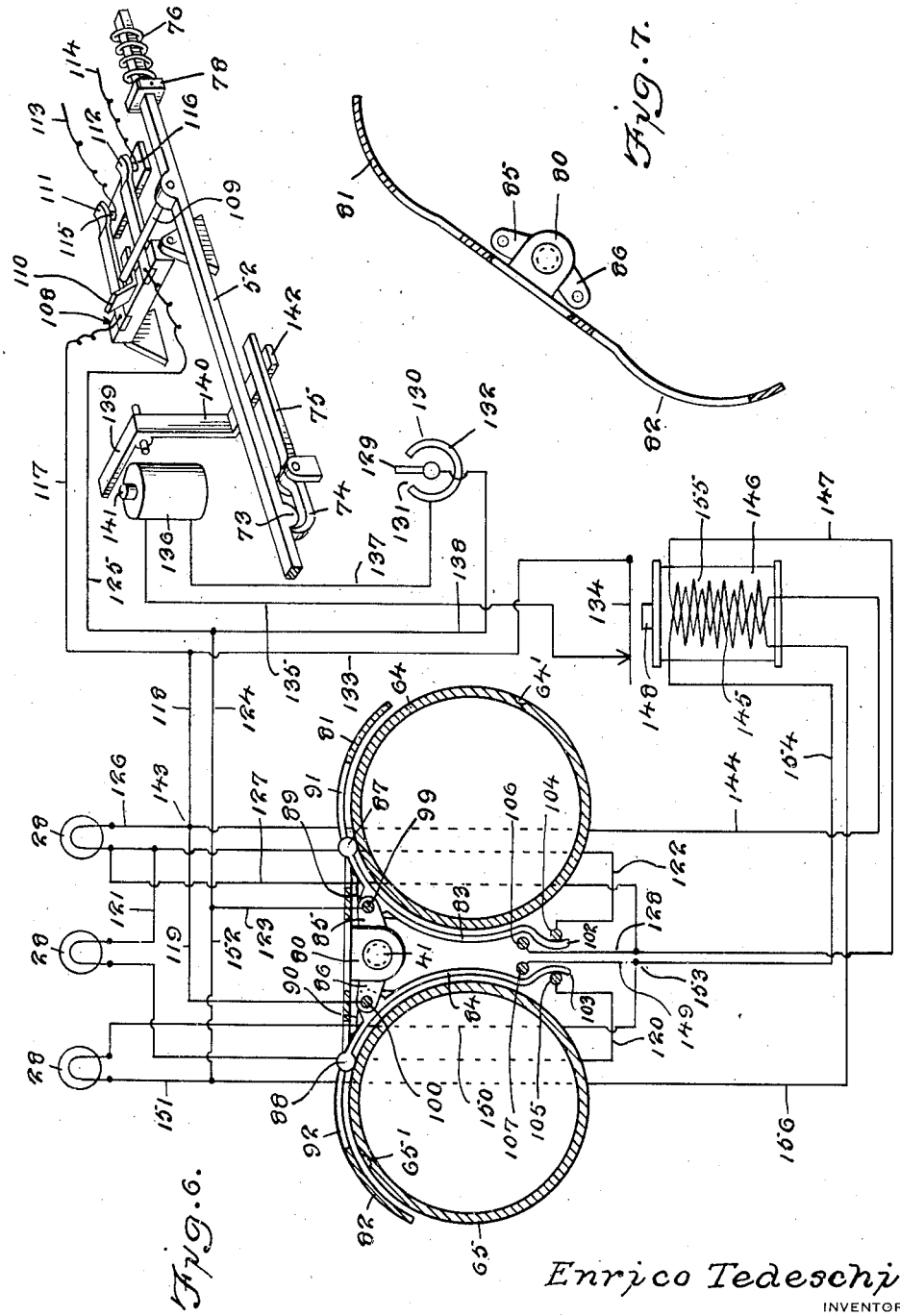
Enrico Tedeschi
INVENTOR
BY Victor J. Evans & Co.
ATTORNEYS Patented Apr. 7, 1942

2,278,905

UNITED STATES PATENT OFFICE 2,278,905

ROAD INDICATOR

Enrico Tedeschi, Tuckahoe, N. Y.

Application July 31, 1939, Serial No. 287,657

7 Claims. (Cl. 200—33)

My invention relates to new and useful improvements in road indicators adapted to apprise the driver of an automotive vehicle as to the nature of the route over which he is traveling.

An important object of my invention is the provision of a road indicator that will impart to the motorist the tortuous characteristics of the road before him.

Another object of my invention is the provision of a road indicator that includes an illuminable means that will be lighted when the vehicle is still a substantial distance from any curve in the road, to inform the driver of its proximity and the direction of the said curve.

Still another object of my invention is the provision of a road indicator that includes illuminable means that will remain energized as long as the driver is on the correct route, but that will be automatically rendered inoperative in the event that the driver, either purposely or through inadvertence, makes a wrong turn.

Yet another object of my invention is to provide a road indicator that includes means to set the device at any point along the contemplated route so that the driver may start from any point on the chart.

A further object of my invention is the provision of a road indicator that will require little or no attention after the trip has started.

A still further object of my invention is the provision of a road indicator that may be readily mounted in a convenient position in proximity to the driver so that he may easily notice the various indicia as they are alternately rendered operative and inoperative in accordance with the nature of the road.

A yet further object of my invention is the provision of a road indicator that is efficient in operation, durable in construction, and inexpensive to manufacture.

Other objects and advantages of my invention will be apparent during the course of the following description.

In the drawings, forming a part of this specification, and in which like numerals are employed to designate like parts throughout the same, Figure 1 is a front elevation of a device embodying my invention, Figure 2 is a longitudinal sectional view of my device, looking toward the rear of the housing enclosing the working parts thereof, showing parts in section and parts in elevation.

Figure 4 is a vertical sectional view, taken on the line 4—4 of Figure 3,

Figure 5 is a vertical sectional view, taken on the line 5—5 of Figure 3,

Figure 6 is a diagrammatical view illustrating the electrical circuits included in my device and showing their association with the mechanical features which control the same, and Figure 7 is a side elevation, showing parts broken away, of a carriage member embodying a part of my invention.

Figure 1:
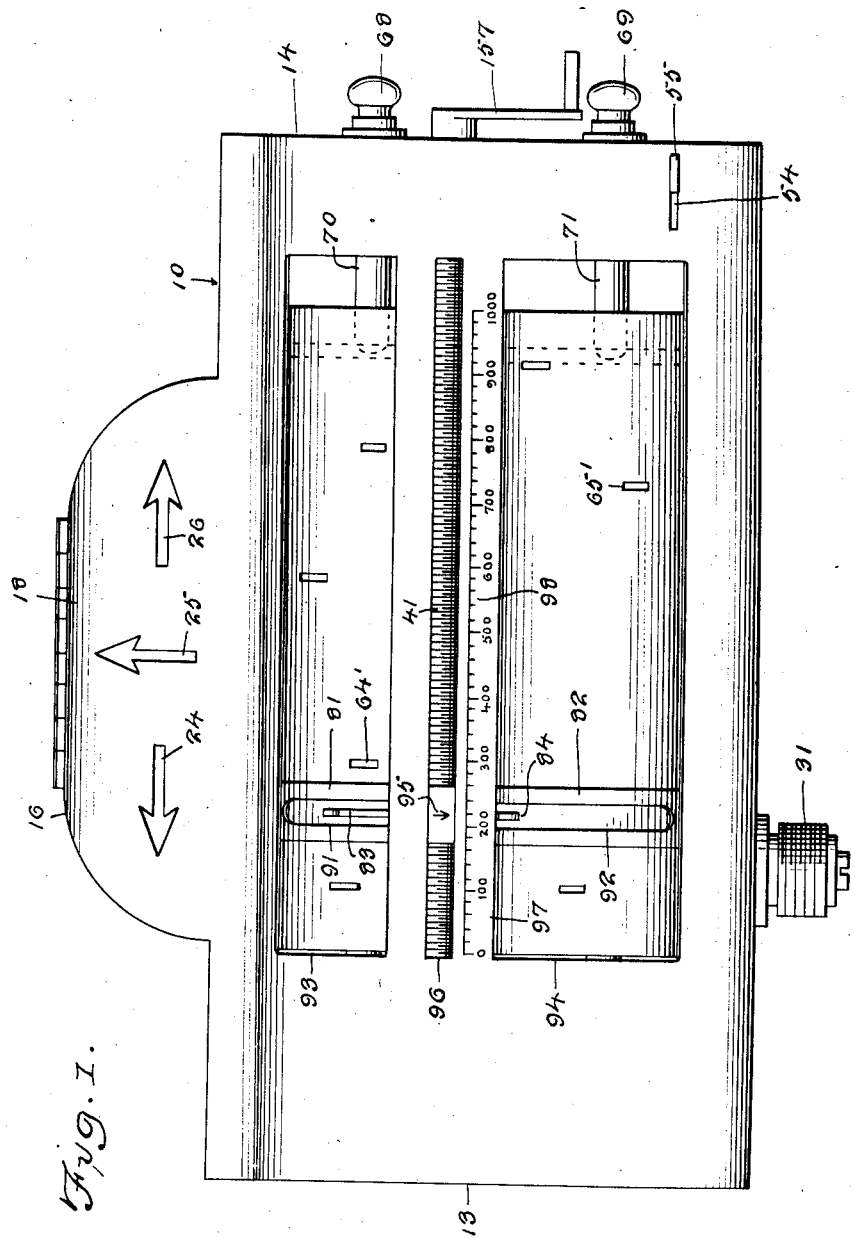

In the accompanying drawings, wherein for the purpose of illustration, is shown a preferred embodiment of my invention, the numeral 10 designates a housing which encloses and supports the moving parts embodying my invention, and which includes a back wall 11, bottom portion 12 and ends 13 and 14. The top 16 of the housing is formed with a domed compartment 18 which is diverted into subcompartments 19, 20 and 21 by the vertical closure walls 22 and 23. To facilitate easy access to the interior of the casing, the front cover 15 is hingedly secured to the top 16 of the domed compartment 18. The lower portion of the cover bellies outwardly and the lower edge 17 thereof curves inwardly to contiguously meet the bottom plate 12 and engages therewith by a snap catch, or the like. The portion of the front cover 15 enclosing the compartments 19, 20 and 21 is cut away as at 24, 25 and 26 in a manner whereby the cutaway portion 24 will be indicative of an arrow pointing to the left. The middle cut out portion 25 will be indicative of an arrow pointing forwardly, and the portion 26 will indicate an arrow pointing to the right. Each of the compartments 19, 20 and 21 is provided with socket member 27 which receives a light bulb 28 so that when one of the bulbs 28 is illuminated, the cut out portion 24, 25 or 26 in front of the illuminated compartment will be easily noticed by the driver of the vehicle. The housing may be mounted on the steering post, or in any convenient position in proximity to the driver, where he may easily notice the arrows 24, 25 and 26 as they are alternately illuminated in accordance with the nature of the road ahead.

The housing 10 is preferably made from a suitable insulated material and the insulated vertical closure walls 29 and 30 are spaced inwardly from the ends 13 and 14. The speedometer cable connection 31 projects from the bottom 12 of the housing adjacent the rear thereof and spaced slightly inwardly from the vertical wall 29, and is adapted to be connected to the speedometer cable, front axle, or the like, by a flexible cable (not shown). The inwardly extending end 32 of the connection carries a drive worm screw 33 in mesh with the worm gear 34 which extends through the aligning opening 37 in the wall 29, and is loosely mounted for rotation on the transversely positioned shaft 35, the rearward end of which is journaled in the back wall 11 and the forward end thereof is supported by the bearing 36 which projects outwardly from the vertical wall 29. The ratchet 38 is keyed to the shaft 35 and the dog 39 carried by the worm gear 34 is adapted to engage the peripheral teeth of the said ratchet wheel to impart rotation to the shaft 35 and to the worm screw 40 at the forward end thereof. When reverse rotation is imparted to the cable connection 31 by a backing motion of the vehicle, the dog 39 will not engage the teeth of the ratchet to rotate the shaft 35. A screw conveyer 41 has either end thereof mounted for rotation in the end walls 13 and 14 adjacent the front of the housing and spaced above the worm 40 so that the worm gear 42, loosely mounted thereon, will mesh with the said worm and rotate therewith.

The substantially Z-shaped member 43 has the middle portion thereof journaled in the inwardly extending supports 44 and 45, and the end of the transversely extending arm 46 thereof is formed with bifurcations 47 and 48 which embrace the friction clutch 49 slidably keyed to the screw conveyer 41. The transversely extending lower arm 50 of the member 43 receives the end 51 of the clutch arm 52 which extends longitudinally of the housing adjacent the rear thereof and with the end 53 extending through the vertical wall 30 and bent laterally forwardly to project through the elongated slot 54 in the front cover 15. The outwardly extending end 55 of the clutch arm 52 may be actuated laterally to move the said clutch 49 into and out of engagement with the worm gear 42. The clutch arm 52 is formed with a protuberance 73 which will be engaged by the pivoted catch 74 when the clutch arm is in the inner position and the clutch 49 in frictional engagement with the worm gear 42. The end 75 of the catch 74 extends a substantial distance beyond its pivot point and is of sufficient weight to maintain the said catch in engagement with the protuberance 73 against the resilient action of the coil spring 76 which is interposed between the vertical bearing 77 and collar 78. The clutch arm may be manually released by the pin 79 which is positioned in the bottom portion 12 of the housing and under the end 75 of the catch 74. When the pin 79 is pushed upwardly into engagement with the catch, the end 75 thereof will be pivoted upwardly to release the clutch arm and to permit the coil spring 76 to move the clutch 49 out of engagement with the worm gear 42.

When the clutch is in close frictional engagement with the worm gear, motion will be transmitted to the screw conveyer 41 and to the pinion 56 which meshes with the circular gears 57 and 58 which are carried by the transverse shafts 59 and 60 adjacent the inner side of the vertical wall 29. The drums 61 and 62 are formed on the inner faces of the circular gears 57 and 58 and frictionally engage the end recesses 63 in the cylinders 64 and 65 to impart rotation thereto. The other ends of the cylinders 64 and 65 are supported by the spring actuated plungers 66 and 67 mounted in the end 14 of the housing, and the knobs 68 and 69 thereof may be manually retracted to withdraw the shanks 70 and 71 from the central recesses in the inwardly spaced end walls 72 of the cylinders. It will be noted that the transverse wall 72 adjacent either end of the cylinders are provided with central recesses which receive the spring actuated plungers 70 and 71, and are positioned inwardly from the extremities thereof so that the cylinders may be reversibly positioned in the housing. By setting the walls 72 inwardly from the extremities of the cylinders either end thereof will receive the drums 61 and 62.

As hereinbefore described the screw conveyer 41 is equidistantly spaced from the peripheries of the cylinders 64 and 65 and the carriage 80 is threadedly received thereon and includes laterally extending arms 81 and 82, the extremities of which are arcuately formed and maintained in spaced superjacent relation to the said cylinders. The electrical contact levers 83 and 84 are pivotally supported by the bifurcations 85 and 86 extending laterally from the carriage 80 and the upper ends thereof are formed with knobs 87 and 88 which are held in close frictional engagement with the peripheries of the cylinders by leaf springs 89 and 90. The knobs 87 and 88 are received in elongated slots 91 and 92 in the arms 81 and 82 and the cover 15 is provided with elongated openings 93 and 94 comprising windows through which the driver of the vehicle observes the relation of the arms to the cylinders and which enable him to properly set the device in accordance with his position along the route. The middle portion of the carriage is provided with an indicating mark such as the arrow 95 which may be observed through the elongated slot 96 positioned intermediate of the openings 93 and 94 and the web 97 between the slot 96 and opening 94 is suitably calibrated, as at 98, to apprise the driver of the distance which he has traveled. Inasmuch as the device is actuated by the speedometer cable, the calibrations 98 may be uniquely spaced in accordance with the speedometer reading so that as the carriage moves longitudinally along the screw conveyer, the movement therealong will be directly proportional to the distance traveled by the vehicle.

The electrical bus wires 99 and 100 slidably receive the bifurcations 85 and 86 of the carriage 80 and hold the contacts 83 and 84 in pivotal relation therewith. The ends of the bus wires are supported by the vertical wall 30 and the supporting members 101 and 102' respectively. The inwardly extending ends 102 and 103 of the contact levers 83 and 84 are maintained in spaced parallelism with the peripheries of the cylinders and the extremities thereof are normally engaged with the bus wires 104 and 105, the ends of which are received by the vertical walls 29 and 30 of the housing. The bus wires 106 and 107 are similarly supported by the end walls and are positioned intermediate of the contact levers 83 and 84 but spaced therefrom in a manner whereby they may be contacted by the said levers when the knobs 87 and 88 of the contacts 83 or 84 engage any of the concavities 64' or 65' in the peripheries of the cylinders 64 or 65. When the ends 102 or 103 of the contact levers are engaged with the bus wires 104 or 105, they will not engage the bus wires 106 or 107, and conversely, when they are engaged with the bus wires 106 and 107, they will be disengaged from the bus wires 104 or 105.

The master switch 108 is supported by the bottom portion 12 of the housing at substantially the middle thereof and is actuated by the laterally extending arm 109 carried by the clutch arm 52. When the clutch arm is in the released position, so that the clutch 49 will be disengaged from the worm wheel 42, the spring 76 will force the end of the arm 109 against the angular clip 110 of the switch to move the contact arms 111 and 112 to the open position, and conversely, when the end 55 of the clutch arm is moved laterally to bring the clutch into engagement with the worm wheel 42 the arm 109 will engage the clip 110 to move the contact arms 111 and 112 into the closed position, as illustrated in Figure 6.

The conductors 113 and 114 are connected to any suitable source of power. When the knobs 87 and 88 of the contact levers 83 and 84 are frictionally engaging the unbroken peripheries of the cylinders 64 and 65, the ends 102 and 103 thereof will be in engagement with the bus wires 104 and 105 so that the current may travel from the switch arm 111 along the conductors 117, 118 and 119 to the bus wire 100 where it will be transferred to the contact lever 84 and bus wire 105. The conductor 120 connects the bus wire 105 with the lamp 28 in the middle compartment 20 of the housing. The conductors 121 and 122 connect the middle lamp 28 with the bus wire 104 which is electrically connected to the bus wire 99 by the contact lever 83, and from the bus wire 99, the current may proceed along the conductors 123, 124 and 125, to the switch arm 112, and back to the source through the connection 114. It may thus be seen that when the master switch is closed and the contact levers frictionally engaging the unbroken peripheries of the cylinders, the middle lamp 28 will be energized to illuminate the middle arrow 25.

If the driver of the vehicle makes a wrong turn to the right or left, either purposely to obtain gas, or through inadvertence, the switch arm 129 mounted on the steering wheel will be moved either to the right or left to engage the points 130 or 131 of the contact ring 132. If it is assumed that a right hand turn is made before the device indicates that such a turn should be made, the normally open steering post switch 132 will be closed and the contact arm 129 will engage the point 130 to close a circuit at this point. The current will now be able to flow from the conductor 117 along the conductor 133, through the normally closed pivoted switch arm 134, along the conductor 135 and through the electromagnet 136 to energize the same. From the magnet 136 the current will be carried by the conductor 137 to the closed steering post switch 132 and along the conductors 138 and 125 to the switch arm 112. By energizing the electromagnet 136, the arm 139 of the pivoted Z-shaped lever 140 will be pulled downwardly into contact with the point 141 of the magnet and the lower arm 142 of the said lever will be pivoted upwardly to release the catch 74 and to permit the coil spring 76 to move the clutch arm 52 into the nonengaging position. As the coil spring 76 forces the clutch arm into this position, the clutch 49 will be disengaged from the worm wheel 42 and the laterally extending arm 109 will engage the clip 110 of the master switch 108 to open the same. When this occurs, both the mechanical and electrical features of the entire device will be rendered inoperative and the driver will be at once made aware of this fact by the extinguishing of the normally energized middle lamp 28. If the mistake were made through inadvertence, the driver will know that he should have continued straight ahead and may then turn the vehicle around and once more resume his position on the correct route. When the front wheels of the vehicle are in longitudinal alignment with the chassis of the vehicle to direct the same straight ahead, the steering post switch 132 will be open so that the electromagnet 136 will be deenergized to release the Z-shaped lever 140. The operator may then reset the device by manually actuating the clutch arm 52 in a manner whereby the catch 74 will engage the protuberance 73, the clutch 49 will once more engage the worm gear 42, and the middle lamp 28 will again be energized.

The concavities 64' and 65' in the cylinders 64 and 65 are uniquely positioned so that the knob 87 of the contact lever 83 will drop into one of the concavities in the cylinder 64 when the vehicle is approximately 100 feet from a right curve in the road, and the knob 88 of the contact lever 84 will drop into a concavity in the cylinder 65 when the vehicle is approximately 100 feet from a left hand turn in the road. When the knob 87 of the contact lever 83 drops into a concavity 64' in the periphery of the cylinder 64 to indicate a right turn, the end 102 thereof will be pivoted into engagement with the bus wire 106 so that the middle lamp 28 will be extinguished and the current will flow through the conductor 113, switch arm 111, conductors 117 and 118 and into the right lamp 28 through the conductor 126. From the right lamp 28 the current will follow the conductors 127 and 128 to the bus wire 106 where it will be conducted by the contact lever 83 to the bus wire 99 and along the conductors 123, 124 and 125 to the switch arm 112 and back to the source through the conductor 114. It may thus be seen that the middle lamp 28 will be extinguished and the right lamp 28 will be energized to illuminate the right arrow 26. The right lamp 28 will be energized a considerable distance before it is actually necessary to make the turn, and the current will divide at the point 143 and follow the conductor 144 to the coil 145 in the relay 146 to energize the same. From the relay the current will follow the conductor 147 and 128 to the bus wire 106 then in engagement with the contact lever 83. From the contact lever 83 the current will flow through the bus wire 99 to the conductor 123 and along the conductors 124 and 125 to the main switch 108. The energization of the relay 146 will pull the contact arm 134 into engagement with the contact 148 of the said relay to break the circuit leading to the steering post switch 132. It may thus be seen that when a right hand turn is indicated that the steering post circuit will be broken so that when the turn is actually made and the arm 129 engages the contact ring 132 the device will not be rendered inoperative. After the turn has been made the concurring rotation of the cylinder and movement of carriage 80 along the screw conveyer 41 will move the knob 87 out of engagement with the said concavity so that the end 102 will be pivoted out of engagement with the bus wire 106 and once more into engagement with the bus wire 104 to deenergize the right lamp 28 and once more illuminate the middle lamp.

The cylinder 65 controls the left hand turns and when a concavity in its periphery aligns with the knob 88 of the contact lever 84, the end 103 thereof will disengage from the bus wire 105 and move into engagement with the bus wire 107 so that the current will pass through the switch arm 111 and flow through the conductors 117, 118, 119 to the bus wire 100 where it will follow the contact lever 84 to the bus wire 107. From the bus wire 107 the current will be carried by the conductors 149 and 150 to the left lamp 29 and along the conductors 151, 152, 124 and 125 to the switch arm 112 of the master switch 108. At the point 153 the current will divide and follow the conductor 154 to the coil 155 of the relay 146 to energize the same. From the relay the current will follow the conductor 156, 152, 124, and 125 to the switch arm 112 of the master switch 108. When the relay 146 is energized by the coil 155 the pivotal contact arm 134 will be pulled downwardly to break the circuit at the steering post and to permit the turn to be made without the device being rendered inoperative.

One of the features of the present invention resides in the provision of means whereby the cylinders 64 and 65 may be reversely used in the housing. Let us assume that the cylinder 64 is used to indicate the right turns and the cylinder 65 is used to indicate the left turns on the outgoing trip. The front cover 15 of the housing may be opened and the spring pressed plungers 70 and 71 may be retracted to release the cylinders 64 and 65 and to permit them to be disengaged from the actuating drums 61 and 62. For the return trip the carriage 80 should be returned to the initial starting position, the cylinder 64 will be reversed end for end and positioned on the drums 62 and the cylinder 65 will be reversed end for end and positioned on the drum 61. It may thus be seen that if the cylinders were initially positioned as illustrated in Figure 6, and the last turn prior to reaching the destination on the outgoing trip were a left hand turn one mile from the destination, that if the cylinders 64 and 65 were reversably positioned and reversed end for end the first indicia of the device on the return trip would be when the knob 87 of the contact arm 83 engaged the concavity in the cylinder 65 approximately one mile along the return trip to indicate a right hand turn.

Figure 2:
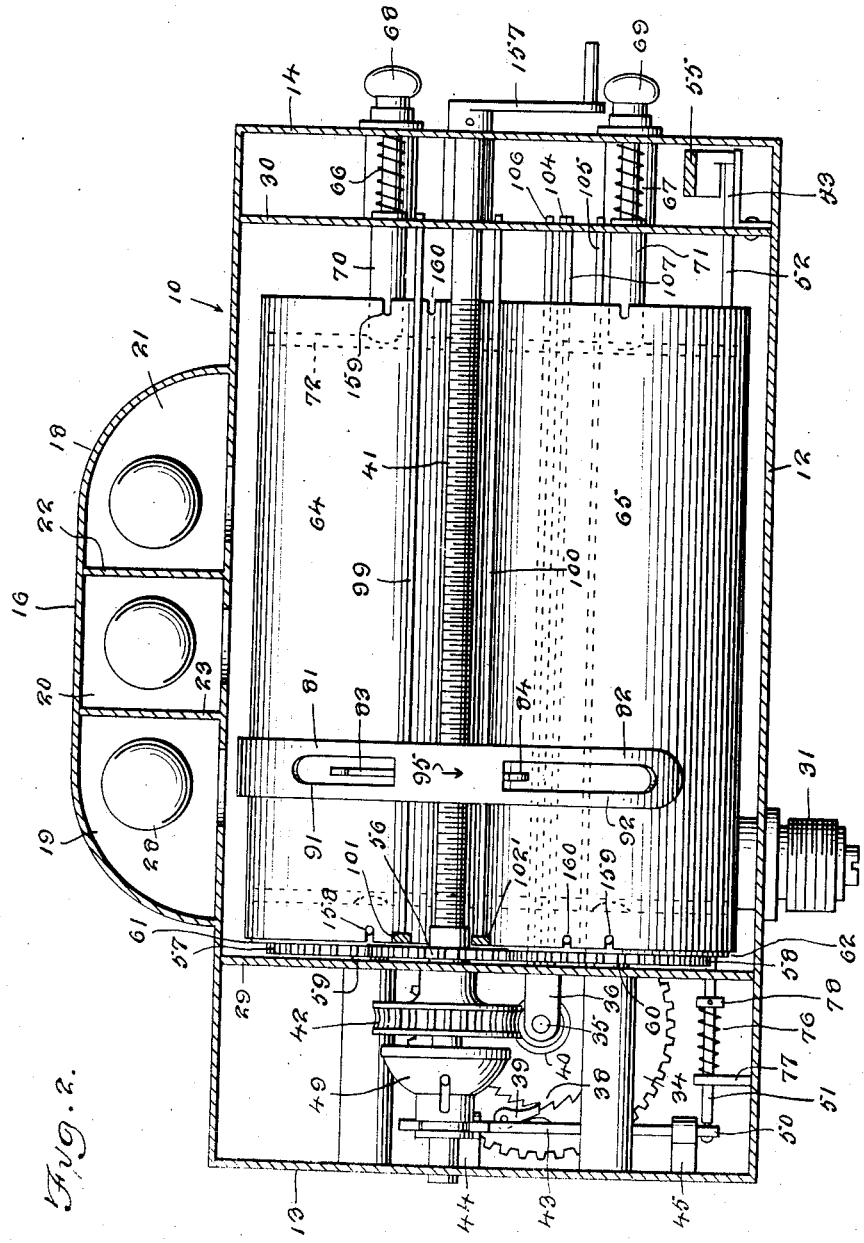
Figure 3:
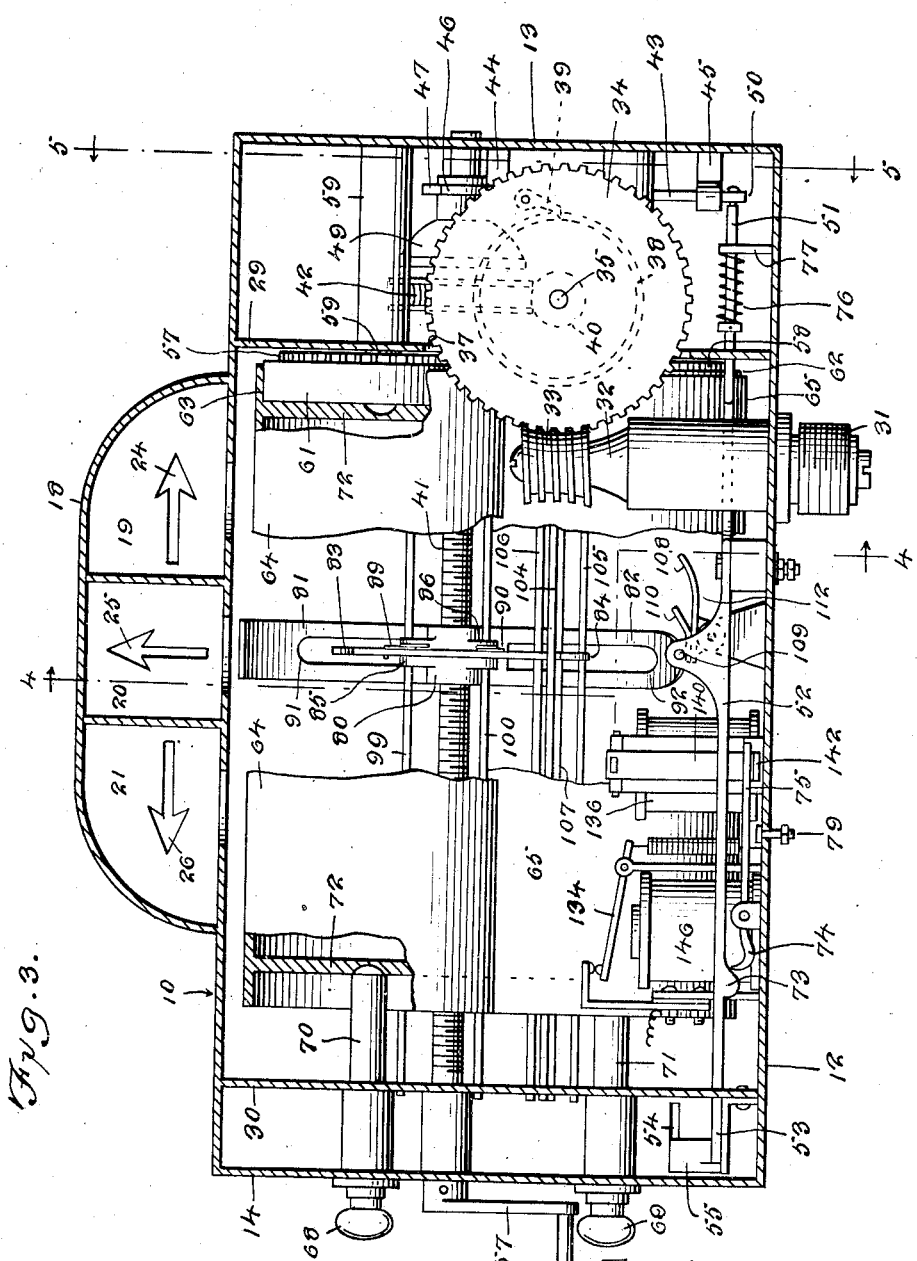
Figure 3 is a longitudinal sectional view of my device, looking toward the front of the said housing, and showing parts in elevation and parts broken away.

The handle 157 is keyed to the screw conveyer 141 and positioned exteriorly of the end wall 14 of the housing so that if the clutch 49 becomes disengaged from the loosely mounted worm gear 42 and the timing of the device be erroneous the handle 157 may be manually rotated to selectively position the carriage 80 at the correct position along the cylinders 64 and 65. After the outgoing trip has been completed and the travellers are ready to begin the return trip the carriage may be manually rotated to the initial position and when the cylinders have been reversely positioned in the manner hereinbefore described the device will be reset for the return trip. The cylinders 64 and 65 may be formed to correspond to any particular section of the road and should be properly marked to indicate what portions they are adapted to cover. Under ordinary conditions the cylinders may be formed to function for a trip of five or six hundred miles. As illustrated in Figure 2, the cylinders 64 and 65 are provided with diametrically opposed notches 158 at one end with spaced notches 159 and 160 at the other end thereof. The drum 61 is provided with laterally extending pins adapted to receive the single slots and the drum 62 is provided with spaced pins received within the spaced slots 159 and 160. This provision will make it impossible to get the cylinders in the reverse order and if the cylinders are properly marked the chance for error will be negligible.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. In a road indicator for motor vehicles, synchronously rotatable cylinders having a plurality of concavities in their outer surfaces, pivoted contacts having one end normally held in frictional engagement with the said cylinders, means to simultaneously progressively move the said contacts longitudinally of the said cylinders, bus bars normally engaged by the other ends of the contacts for the full extent of their travel, and bus bars normally spaced from the said pivoted contacts, for the full extent of their travel, movement of the first-mentioned ends of the contacts into register with the concavities in the cylinder surfaces effecting pivoting of the contacts whereby the said second ends will disengage from the said first bus bars and engage with the said second bus bars.

2. In a road indicator for motor vehicles, synchronously rotatable cylinders having a plurality of concavities in their outer surfaces, a pivoted contact lever arranged adjacent each of the cylinders, each of said levers having one end normally held in frictional engagement with its respective cylinder, means to simultaneously progressively move the said contact levers longitudinally of the said cylinders, and a bus bar normally spaced from the opposite ends of each of the said pivoted contact levers for the full extent of their travel, said bus bars being engaged by the mentioned ends of the contact levers when pivotal actuation of the levers is effected by movement of the first-mentioned ends into register with a concavity in the cylinder surfaces.

3. A road indicator for motor vehicles, rotatable companion cylinders having a plurality of concavities in their outer peripheries, drive means operatively connected with the cylinders and adapted to synchronously rotate the same, a screw conveyer spaced from the said cylinders and rotated by the said drive means, a carriage carried by the screw conveyer and having arms movable longitudinally along each of the said cylinders, a contact lever pivotally mounted on each of the said carriage arms and with one end in spring pressed engagement with the said cylinders, and bus bars disposed laterally of the said cylinders and normally engaging the opposite ends of the said contact arms for the full extent of their travel, and bus bars normally spaced from the last-mentioned ends of the contact levers for the full extent of their travel, movement of the first-mentioned ends of the levers into register with the concavities in the peripheries of the cylinders effecting pivoting of the contact levers to move the second-mentioned ends thereof out of engagement with the first bus bars and into engagement with the said second bus bars.

4. A road indicator for motor vehicles, rotatable companion cylinders having a plurality of concavities in their outer peripheries, drive means operatively connected with the cylinders to synchronously rotate the same, a carriage having arms, means cooperative with the drive means for moving the carriage longitudinally along the said cylinders, contact levers pivotally mounted on the said carriage arms and with one end in spring pressed engagement with the said cylinders, and bus bars disposed laterally of the said cylinders and normally engaging the opposite ends of the said contact arms for the full extent of their travel.

5. A road indicator for automotive vehicles, laterally spaced rotatable companion cylinders having a plurality of concavities in their outer peripheries, drive means operatively connected with the cylinders to synchronously rotate the same, a carriage having arms, a feed mechanism responsive to movements of the drive means to effect travel of the carriage longitudinally along the said cylinders, contact levers pivotally mounted on the said carriage arms and with one end in spring pressed engagement with the said cylinders, bus bars disposed laterally of the said cylinders and normally engaging the said contact levers for the full extent of their travel, and bus bars normally spaced from the said contact levers for the full extent of their travel and adapted to be contacted thereby when the spring pressed ends thereof register with concavities in the cylinders.

6. In a road indicator for motor vehicles, synchronously rotatable cylinders having a plurality of concavities in their outer surfaces, a pivoted contact lever arranged adjacent each of the cylinders, each of said levers having one end normally held in frictional engagement with its respective cylinder, means to simultaneously and progressively move the said contact levers longitudinally of the cylinders, and a bus bar normally engaged by the opposite ends of each of the said pivoted contact levers for the full extent of their travel, said bus bars being disengaged from the mentioned ends of the contact levers when pivotal actuation of the levers is effected by movement of the first-mentioned ends into register with the said concavities in the cylinder surfaces.

7. In a road indicator for motor vehicles, rotatable companion cylinders having a plurality of concavities in their outer peripheries, drive means operatively connected with the cylinders to synchronously rotate the same, a carriage having arms, means cooperative with the drive means for moving the carriage longitudinally along the cylinders, contact levers pivotally mounted on the carriage arms and with one end in spring pressed engagement with the cylinders, flat bars disposed laterally of the cylinders and normally engaging the other ends of the contact levers for the full extent of their travel, and bus bars normally spaced from the contact levers for the full extent of their travel and adapted to be contacted thereby only when the spring pressed ends thereof register with concavities in the cylinders.

ENRICO TEDESCHI.